(12) United States Patent
Abe et al.

(10) Patent No.: US 10,571,769 B2
(45) Date of Patent: Feb. 25, 2020

(54) DISPLAY DEVICE

(71) Applicant: Japan Display Inc., Minato-ku (JP)

(72) Inventors: Hiroyuki Abe, Tokyo (JP); Kentaro Agata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 155 days.

(21) Appl. No.: 15/833,062

(22) Filed: Dec. 6, 2017

(65) Prior Publication Data

US 2018/0203318 A1 Jul. 19, 2018

(30) Foreign Application Priority Data

Jan. 13, 2017 (JP) ................................. 2017-004029

(51) Int. Cl.

| | |
|---|---|
| *G02F 1/1362* | (2006.01) |
| *G02F 1/1333* | (2006.01) |
| *G02F 1/1339* | (2006.01) |
| *G09G 3/36* | (2006.01) |
| *G02F 1/1345* | (2006.01) |

(52) U.S. Cl.
CPC ...... *G02F 1/136286* (2013.01); *G02F 1/1339* (2013.01); *G02F 1/13452* (2013.01); *G02F 1/133345* (2013.01); *G09G 3/3688* (2013.01); *G02F 1/13454* (2013.01); *G02F 1/13458* (2013.01); *G02F 2001/13629* (2013.01); *G02F 2001/136295* (2013.01); *G09G 2300/0408* (2013.01); *G09G 2300/0426* (2013.01); *G09G 2300/0452* (2013.01); *G09G 2310/0297* (2013.01)

(58) Field of Classification Search
CPC combination set(s) only.
See application file for complete search history.

(56) References Cited

U.S. PATENT DOCUMENTS 6,433,767 B1 * 8/2002 Murade ............... G02F 1/13454
 345/92
8,581,813 B2 * 11/2013 Park ..................... G09G 3/3648
 345/204

(Continued)

FOREIGN PATENT DOCUMENTS

JP 2016-200659 12/2016

*Primary Examiner* — Patrick N Edouard
*Assistant Examiner* — Peijie Shen
(74) *Attorney, Agent, or Firm* — Oblon, McClelland, Maier & Neustadt, L.L.P.

(57) ABSTRACT

It is possible to reduce a size of a lower frame region to ensure a wiring corrosion margin equivalent to that of a conventional technique. In a display device, a video signal wiring arranged in the lower frame region includes, in a region between a terminal section (terminal) and a video signal line, a first wiring formed on a first wiring layer and having one end connected to the terminal section to which a video signal line driving circuit is connected, a second wiring formed on a second wiring layer different from the first wiring layer and having one end connected to the other end of the first wiring, and a third wiring formed on the first wiring layer and having one end connected to the other end of the second wiring. The other end of the third wiring is connected to the video signal line via a fourth wiring formed on the second wiring layer, and the first wiring layer is formed on the side closer to an array substrate than to the second wiring layer.

9 Claims, 11 Drawing Sheets

(56) References Cited

U.S. PATENT DOCUMENTS

| | | | |
|---|---|---|---|
| 9,536,910 B2 | 1/2017 | Koide et al. | |
| 2015/0077317 A1* | 3/2015 | Miyamoto | G02F 1/1345 345/87 |
| 2015/0160523 A1* | 6/2015 | Fukami | G02F 1/136286 349/47 |
| 2016/0300863 A1* | 10/2016 | Koide | H01L 27/124 |
| 2017/0176798 A1* | 6/2017 | Ahn | G02F 1/1345 |
| 2018/0031936 A1* | 2/2018 | Enami | G09G 3/001 |
| 2018/0031937 A1* | 2/2018 | Takahashi | G02F 1/1345 |
| 2018/0032190 A1* | 2/2018 | Koide | G06F 3/0416 |
| 2018/0180911 A1* | 6/2018 | Odaka | G02F 1/133305 |

* cited by examiner

DISPLAY DEVICE

CROSS-REFERENCE TO RELATED APPLICATION

The present application claims priority from Japanese Patent Application No. 2017-4029 filed on Jan. 13, 2017, the content of which is hereby incorporated by reference into this application.

TECHNICAL FIELD OF THE INVENTION

The present invention relates to a display device, and a technique effectively applied to a display device including a frame region provided outside a display region, for example.

BACKGROUND OF THE INVENTION

A display device such as a liquid crystal display device includes an array substrate and an opposite substrate arranged opposite the array substrate. The array substrate includes a display region and a frame region arranged outside the display region. A plurality of pixels, a plurality of scanning signal lines, and a plurality of video signal lines are arranged within the display region. A region in the frame region is referred to as a lower frame region, a driving circuit for feeding a video signal to each of the video signal lines being mounted in the region.

Japanese Patent Application Laid-Open No. 2016-200659 (Patent Document 1) discloses, for example, a display panel including a video signal wiring, the video signal wiring extending to a driving circuit, which feeds a video signal to each video signal line, from a position where a semiconductor chip serving as the driving circuit is arranged in a lower frame region in an array substrate.

SUMMARY OF THE INVENTION

In the above-described display device, the plurality of scanning signal lines and the plurality of video signal lines are respectively arranged on mutually different metal layers within the display region in the array substrate. For example, a video signal wiring in the lower frame region in the array substrate is electrically connected to the video signal lines within the display region, and is drawn around from the driving circuit to a periphery of an end of the opposite substrate by using wirings having the two metal layers on which the video signal lines and the scanning signal lines are respectively arranged. If the video signal wiring is divided into two layers up to the vicinity of a terminal section of the driving circuit, a process becomes complicated, and the wiring having the metal layer (generally, Molybdenum (Mo) layer) used for the scanning signal lines is not appropriate for miniaturization, which affects an increase of a region where the wiring is drawn around.

In addition, for the purpose of protecting the video signal wiring in the lower frame region against wiring corrosion due to entering of water into a wiring having the same layer as that of the video signal line closer to a surface layer into the periphery of the opposite substrate from the driving circuit, an organic insulating film existing in the display region is formed up to the vicinity of the terminal section. However, the organic insulating film also has a property of easily containing water. Therefore, there is a problem of water entering the display region via the organic insulating film.

To avoid this, the video signal wiring may be drawn around by using only the wiring having the metal layer on which the scanning signal lines are arranged into the periphery of the end of the opposite substrate from the driving circuit. However, in this case, the wiring is difficult to miniaturize, and the region where the wiring is drawn around is difficult to reduce, as described above.

The present invention has been made to solve the above-described problems of a conventional technique, and has an object of reducing a size or dimensions of a lower frame region to ensure a wiring corrosion margin equivalent to that of the conventional technique.

The following is a brief description of an outline of the typical invention disclosed in the present application.

A display device according to one embodiment of the present invention is a display device including, on a first substrate, a display region and a frame region formed around the display region in a plan view. A plurality of pixels, a plurality of scanning signal lines, and a plurality of video signal lines are arranged in the display region. A plurality of video signal wirings electrically connected to the plurality of video signal lines, and a plurality of terminal sections for feeding a video signal to the plurality of video signal wirings are arranged in the frame region. In a region between each of the terminal sections and each of the video signal lines, each of the video signal wirings arranged in the frame region includes: a first wiring formed on a first wiring layer and having one end connected to a terminal to which a driving circuit is connected; a second wiring formed on a second wiring layer different from the first wiring layer and having one end connected to the other end of the first wiring; and a third wiring formed on the first wiring layer and having one end connected to the other end of the second wiring. Then, the other end of the third wiring is connected to the video signal lines via a fourth wiring formed on the second wiring layer, and the first wiring layer is formed on a side closer to the first substrate than to the second wiring layer.

BRIEF DESCRIPTIONS OF THE DRAWINGS

DESCRIPTIONS OF THE PREFERRED EMBODIMENTS

Figure 1:
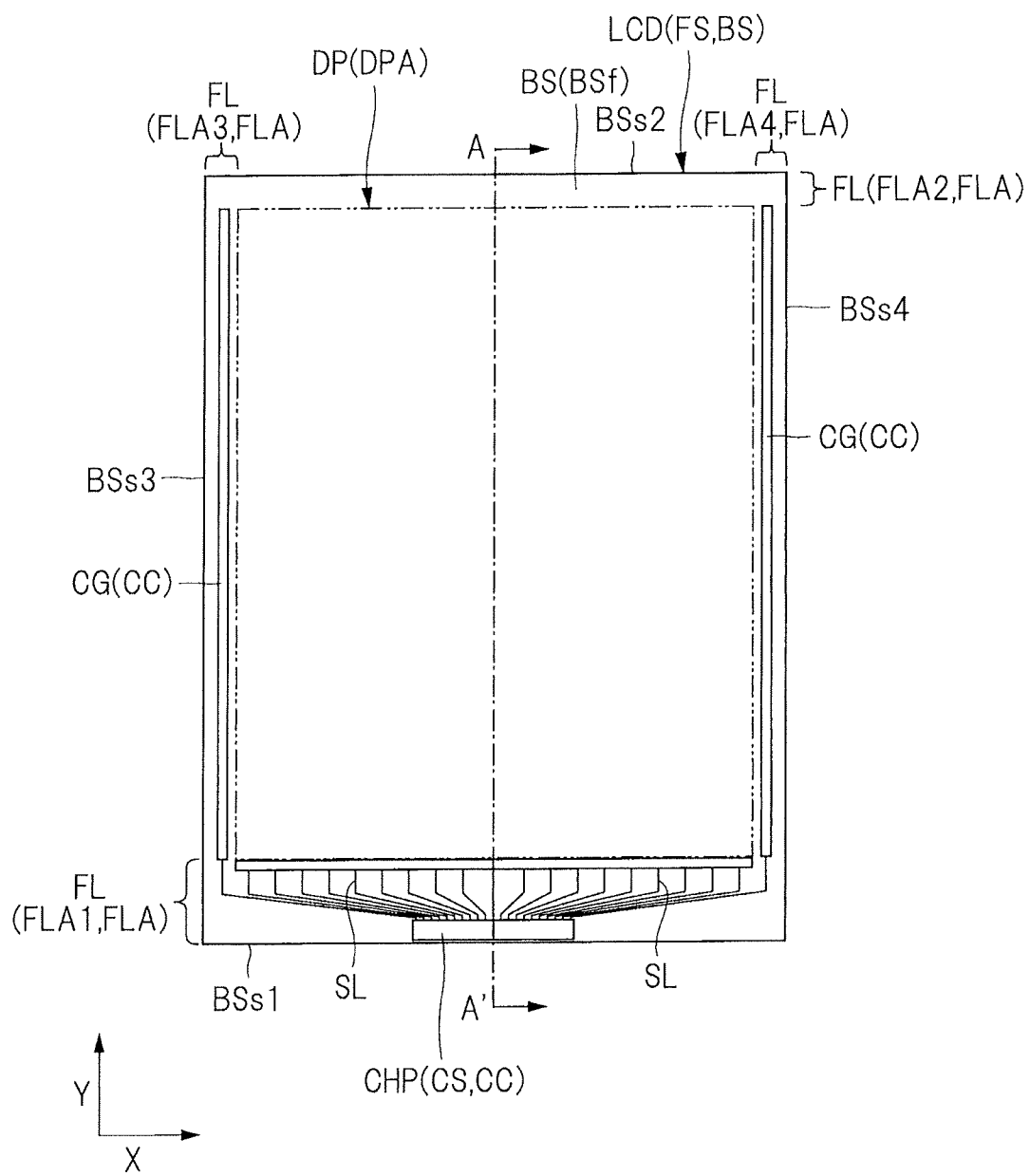
FIG. 1 is a plan view illustrating an example of a display device according to an embodiment.

Hereinafter, embodiments of the present invention will be described in detail with reference to the accompanying drawings.

Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention.

In addition, the same reference characters are applied to the same elements as those described in relation to the foregoing drawings in the present specification and the respective drawings, and detailed descriptions thereof will be appropriately omitted in some cases.

Also, in some drawings used in the following embodiment, hatching is omitted even in a cross-sectional view so as to make the drawings easy to see. In addition, hatching is used even in a plan view so as to make the drawings easy to see.

A technique described in the following embodiment is widely applicable to a display device including a mechanism for feeding a signal from around a display region to a plurality of elements, the plurality of elements being provided in the display region which is provided with a display functional layer. As examples of the above-described display device, exemplified can be various display devices such as a liquid crystal display device and an organic Electro-Luminescence (EL) display device. In the embodiment described below, the liquid crystal display device will be taken as a typical example of the display device and be explained.

In addition, a display device in a transverse electric field mode is taken as an example in the embodiment described below, but the present invention is not limited to such a display device.

Embodiment

<Configuration of Display Device>

Figure 2:
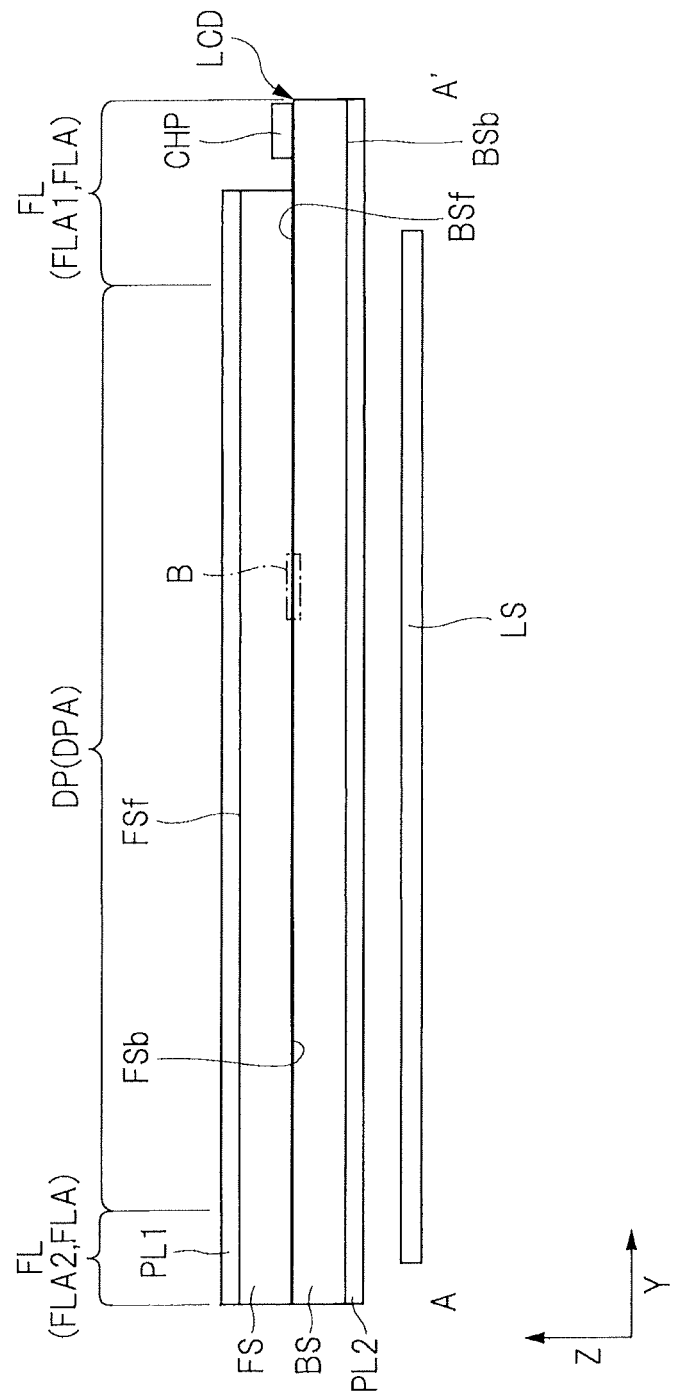
FIG. 2 is a cross-sectional view illustrating the example of the display device according to the embodiment.
Figure 3:
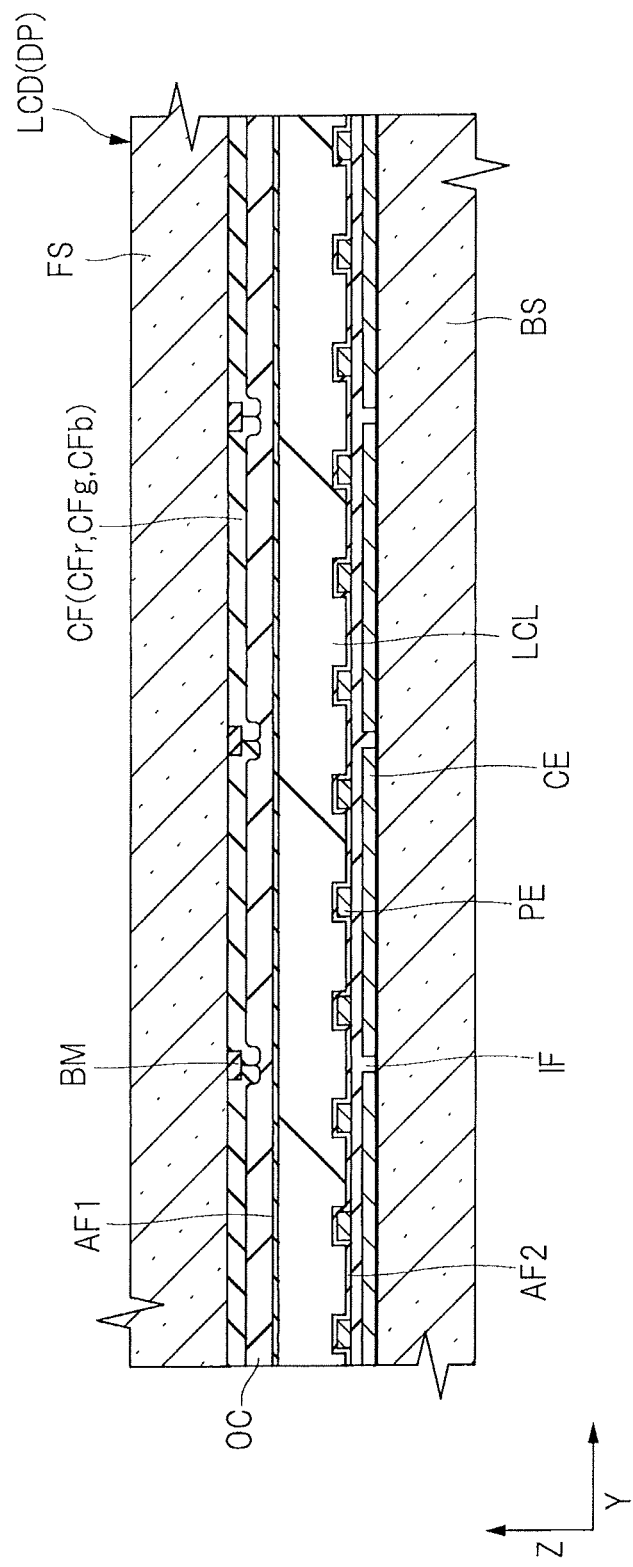
FIG. 3 is a cross-sectional view illustrating the example of the display device according to the embodiment.

First, a configuration of a display device will be described with reference to FIGS. 1 to 3. FIG. 1 is a plan view illustrating an example of the display device according to the embodiment. FIGS. 2 and 3 are cross-sectional views each illustrating the example of the display device according to the embodiment. FIG. 2 is a cross-sectional view taken along line A-A' illustrated in FIG. 1. FIG. 3 is an enlarged sectional view of a portion B illustrated in FIG. 2.

Incidentally, for viewability in FIG. 1, illustrations of scanning signal lines GL (see FIG. 4, described below) and video signal lines SL (see FIG. 4 described below) are omitted in a display region DPA. In addition, FIG. 2 illustrates a cross section, but its hatching is omitted for viewability.

As illustrated in FIG. 1, a display device LCD according to the present embodiment includes a display section DP where an image is displayed. The display device LCD includes an array substrate BS and an opposite substrate FS, and a region, which is provided with the display section DP, in the array substrate BS is, for example, the display region DPA. The display device LCD includes, in a plan view, a frame section (peripheral section) FL that is a peripheral part of the display section DP and displays no image. A region provided with the frame section FL is a frame region FLA. That is, the frame region FLA is a region (a peripheral region) outside the display region DPA.

Incidentally, in the specification of the present application, "in a plan view" means being viewed from a direction perpendicular to an opposite surface BSf (see FIG. 2) serving as a main surface of the array substrate BS, as illustrated in FIG. 1. In addition, two directions intersecting each other, favorably perpendicular to each other, within the opposite surface BSf serving as the main surface of the array substrate BS are respectively taken as an X-axis direction and a Y-axis direction, and a direction perpendicular to the opposite surface BSf serving as the main surface of the array substrate BS is taken as a Z-axis direction (see FIG. 2).

In addition, the display device LCD has a structure in which a liquid crystal layer serving as a display functional layer is formed between a pair of substrates oppositely arranged. That is, as illustrated in FIG. 2, the display device LCD includes the opposite substrate FS on a display surface side, the array substrate BS positioned opposite the opposite substrate FS, and a liquid crystal layer LCL (see FIG. 3) arranged between the opposite substrate FS and the array substrate BS.

In addition, the array substrate BS illustrated in FIG. 1 has, in a plan view, a side BSs1 extending along the X-axis direction, a side BSs2 parallel to the side BSs1 and extending along the X-axis direction, a side BSs3 extending along the Y-axis direction intersecting the X-axis direction, favorably perpendicular thereto, and a side BSs4 parallel to the side BSs3 and extending along the Y-axis direction. Respective distances from the sides BSs2, BSs3, and BSs4 of the array substrate BS illustrated in FIG. 1 to the display section DP are substantially similar to one another, and are shorter than a distance from the side BSs1 to the display section DP.

Hereinafter, in the specification of the present application, a description "a peripheral edge of the array substrate BS" means any one of the sides BSs1, BSs2, BSs3, and BSs4 constituting an outer edge of the array substrate BS. In addition, a mere description "a peripheral edge" means a peripheral edge of the array substrate BS.

The display section DP includes a plurality of pixels Pix serving as display elements (see FIG. 4 described below). That is, the plurality of pixels Pix are provided on the display region DPA in the array substrate BS. The plurality of pixels Pix are arranged in a matrix shape in the X-axis direction and the Y-axis direction. In the present embodiment, each of the plurality of pixels Pix has a thin-film transistor (TFT) formed in the display region DPA on the opposite surface BSf side of the array substrate BS.

The display device LCD includes a plurality of scanning signal lines GL and a plurality of video signal lines SL, as described below with reference to FIG. 4. As described below with reference to FIG. 4, each of the plurality of scanning signal lines GL is electrically connected to the plurality of pixels Pix arranged in the X-axis direction, and each of the plurality of video signal lines SL is electrically connected to the plurality of pixels Pix arranged in the Y-axis direction.

In addition, the display device LCD includes a driving circuit CC. The driving circuit CC includes a scanning signal line driving circuit CG and a video signal line driving circuit CS. As described below with reference to FIG. 4, the scanning signal line driving circuit CG is electrically connected to the plurality of pixels Pix via the plurality of scanning signal lines GL, and the video signal line driving circuit CS is electrically connected to the plurality of pixels Pix via the plurality of video signal lines SL.

In the example illustrated in FIG. 1, the frame region FLA includes frame regions FLA1, FLA2, FLA3, and FLA4. The frame region FLA1 is, in a plan view, a region arranged on one side (lower side in FIG. 1) of the display region DPA in the Y-axis direction, and is a region on which a semiconductor chip CHP is mounted. The frame region FLA2 is a region arranged on an opposite side (upper side in FIG. 1) to the frame region FLA1 with the display region DPA sandwiched therebetween. The frame region FLA3 is, in a plan view, a region arranged on one side (left side in FIG. 1) of the display region DPA in the X-axis direction, and the frame region FLA4 is a region arranged on an opposite side to the frame region FLA3 with the display region DPA sandwiched therebetween.

In the example illustrated in FIG. 1, the array substrate BS is provided with the semiconductor chip CHP. The semiconductor chip CHP is mounted within the frame region FLA1 in a plan view. The video signal line driving circuit CS is provided within the semiconductor chip CHP. Therefore, the video signal line driving circuit CS is provided in the frame region FLA1 serving as a region on the opposite surface BSf side of the array substrate BS and as a region arranged on the one side of the display region DPA in the Y-axis direction.

Incidentally, the frame region FLA1 on which the semiconductor chip CHP is mounted may be referred to as a lower frame region, and the frame region FLA2 arranged on an opposite side to the frame region FLA1 with the display region DPA sandwiched therebetween may be referred to as an upper frame region. At this time, the frame regions FLA3 and FLA4 arranged on both sides of the display region DPA in a direction (X-axis direction) intersecting a direction (Y-axis direction) in which the frame region FLA1 is arranged may be respectively referred to as a left frame region and a right frame region.

In addition, the semiconductor chip CHP may be provided in the frame region FLA1 by using a so-called Chip On Glass (COG) technique, or may be provided outside the array substrate BS and connected to the array substrate BS via flexible printed circuits (FPC). The frame region FLA1 is provided with a terminal section for connecting the array substrate BS and an external device(s).

Incidentally, as described below with reference to FIGS. 5 to 7, the display device LCD includes a seal SEL arranged within the frame region FLA in a plan view. The seal SEL is formed to continuously surround the display section DP, and the opposite substrate FS and the array substrate BS illustrated in FIG. 2 are adhesively fixed to each other by using a sealing material provided on the seal SEL. Since the seal SEL is thus provided around the display section DP, the liquid crystal layer LCL (see FIG. 3) serving as a display functional layer can be sealed therewith.

In addition, as illustrated in FIG. 2, a backlight LS composed of an optical element such as a light source or a diffusion plate, and a polarizing plate PL2 which polarizes light generated from the backlight LS are provided on a back surface BSb side of the array substrate BS in the display device LCD. The polarizing plate PL2 is fixed to the array substrate BS. On the other hand, a polarizing plate PL1 is provided on a back surface FSf side of the opposite substrate FS. The polarizing plate PL1 is fixed to the opposite substrate FS.

Incidentally, basic component parts in the display device LCD are exemplified in FIG. 2, but other component parts such as a touch panel and a protective layer can be added to the component parts illustrated in FIG. 2 as a modification.

In addition, as illustrated in FIG. 3, the display device LCD includes a plurality of pixel electrodes PE and common electrodes CE arranged between the opposite substrate FS and the array substrate BS. The display device LCD according to the present embodiment is the display device in a transverse electric field mode as described above, so that the plurality of pixel electrodes PE and common electrodes CE are each formed on the array substrate BS.

The array substrate BS is composed of a glass substrate or the like, and a circuit for image display is mainly formed thereon. The array substrate BS has the opposite surface BSf (see FIG. 2) positioned on the opposite substrate FS side, and the back surface BSf (see FIG. 2) positioned on an opposite side thereto. Driving elements such as TFTs, and the plurality of pixel electrodes PE are formed in a matrix shape on the opposite surface BSf side of the array substrate BS. In addition, the array substrate BS includes the display region DPA and the frame region FLA provided outside the display region DPA. The array substrate BS may be formed of a resin made of polyimide etc. besides a glass substrate.

An example illustrated in FIG. 3 indicates the display device LCD in a transverse electric field mode (specifically, a Fringe Field Switching (FFS) mode), so that the common electrodes CE are formed on the opposite surface BSf side of the array substrate BS (see FIG. 2) and are covered with an inorganic insulating film IF. In addition, the plurality of pixel electrodes PE are formed on the opposite substrate FS side of the inorganic insulating film IF to face the common electrodes CE via the inorganic insulating film IF. Incidentally, the video signal line SL, the scanning signal lines GL, a semiconductor layer of the TFT, and various types of insulating film layers are formed between the common electrode CE and the array substrate BS although omitted in FIG. 3.

In addition, the opposite substrate FS illustrated in FIG. 3 is composed of a glass substrate or the like, and a color filter CF, which forms a color display image(s), is formed thereon. The opposite substrate FS has the back surface FSf (see FIG. 2) as a display surface side, and the opposite surface FSb (see FIG. 2) positioned opposite the back surface FSf. The opposite substrate FS is arranged opposite the array substrate BS with the opposite surface BSf of the array substrate BS and the opposite surface FSb of the opposite substrate FS opposing each other. Incidentally, the array substrate BS can also be referred to as a TFT substrate, and the opposite substrate FS on which the color filter CF is formed can also be referred to as a color filter substrate. In addition, as a modification to FIG. 3, a configuration in which the color filter CF is provided on the array substrate BS serving as the TFT substrate may be adopted.

The color filter CF on the opposite substrate FS has color filter pixels CFr, CFg, and CFb having three colors of red (R), green (G), and blue (B) and periodically arranged thereon.

In addition, light shielding films BM are formed in respective boundaries among the color filter pixels CFr, CFg, and CFb in the colors. The light shielding film BM is referred to as a black matrix, and is composed of a film having a light shielding property composed of a black resin, low-reflective metal, or the like. The light shielding films BM are formed in a lattice shape in a plan view.

The light shielding films BM are formed also in each of the display region DPA and the frame region FLA. Generally, an end of an opening is defined as a boundary between the display region DPA and the frame region FLA, the end being formed on a peripheral edge side of the opening that is formed in the shielding film BS and in which the color filter CF is embedded. Incidentally, a dummy color filter may be provided on a peripheral edge side of the display region DPA. Incidentally, the light shielding films BM formed in the frame region FLA each are provided to an end of the opposite substrate FS from the display region EPA.

In addition, the opposite substrate FS includes a resin layer OC covering the color filter CF. The light shielding films BM are formed in the boundaries among the color filter pixels CFr, CFg, and CFb in the respective colors, so that a surface on a liquid crystal layer LCL side of the color filter CF becomes uneven (a concave-convex surface). The resin layer OC functions as a flattening film for flattening the unevenness of the surface on the liquid crystal layer LCL side of the color filter CF. Alternatively, the resin layer OC functions as a protective film for preventing impurities from being diffused to the liquid crystal layer from the color filter CF. The resin layer OC can cure a resin material by containing such a component to be cured due to energy irradiation as a thermosetting resin or a light curing resin. The resin layer OC is also provided in the frame region FLA.

In addition, the liquid crystal layer LCL, which forms a display image through an electric field formed by a display voltage being applied between the pixel electrode PE and the common electrode CE, is provided between the opposite substrate FS and the array substrate BS.

In addition, the opposite substrate FS includes an orientation film AF1 covering the resin layer OC on the opposite surface FSb serving as an interface contacting with the liquid crystal layer LCL. In addition, the array substrate BS includes an orientation film AF2 covering the inorganic insulating film IF and the plurality of pixel electrodes PE on the opposite surface BSf serving as an interface contacting with the liquid crystal layer LCL. The orientation films AF1 and AF2 are each a resin film formed to make an initial orientation of a liquid crystal included in the liquid crystal layer LCL uniform, and is composed of a polyimide resin, for example. The orientation films AF1 and AF2 may be provided also in the frame region FLA, and may also be provided up to the end of the opposite substrate FS.

In the display device LCD illustrated in FIG. 3, light emitted from the backlight LS (see FIG. 2) is filtered by the polarizing plate PL2 (see FIG. 2), and is incident on the liquid crystal layer LCL. The light incident on the liquid crystal layer LCL is emitted from the opposite substrate FS by changing a polarization state depending on the liquid crystal.

At this time, the orientation of the liquid crystal is controlled through the electric field formed by applying a voltage to the pixel electrode PE and the common electrode CE, and the liquid crystal layer LCL functions as an optical shutter.

<Equivalent Circuit of Display Device>

Then, an equivalent circuit of the display device LCD will be described with reference to FIG. 4. FIG. 4 illustrates an example of the equivalent circuit of the display device LCD according to the embodiment.

Figure 4:
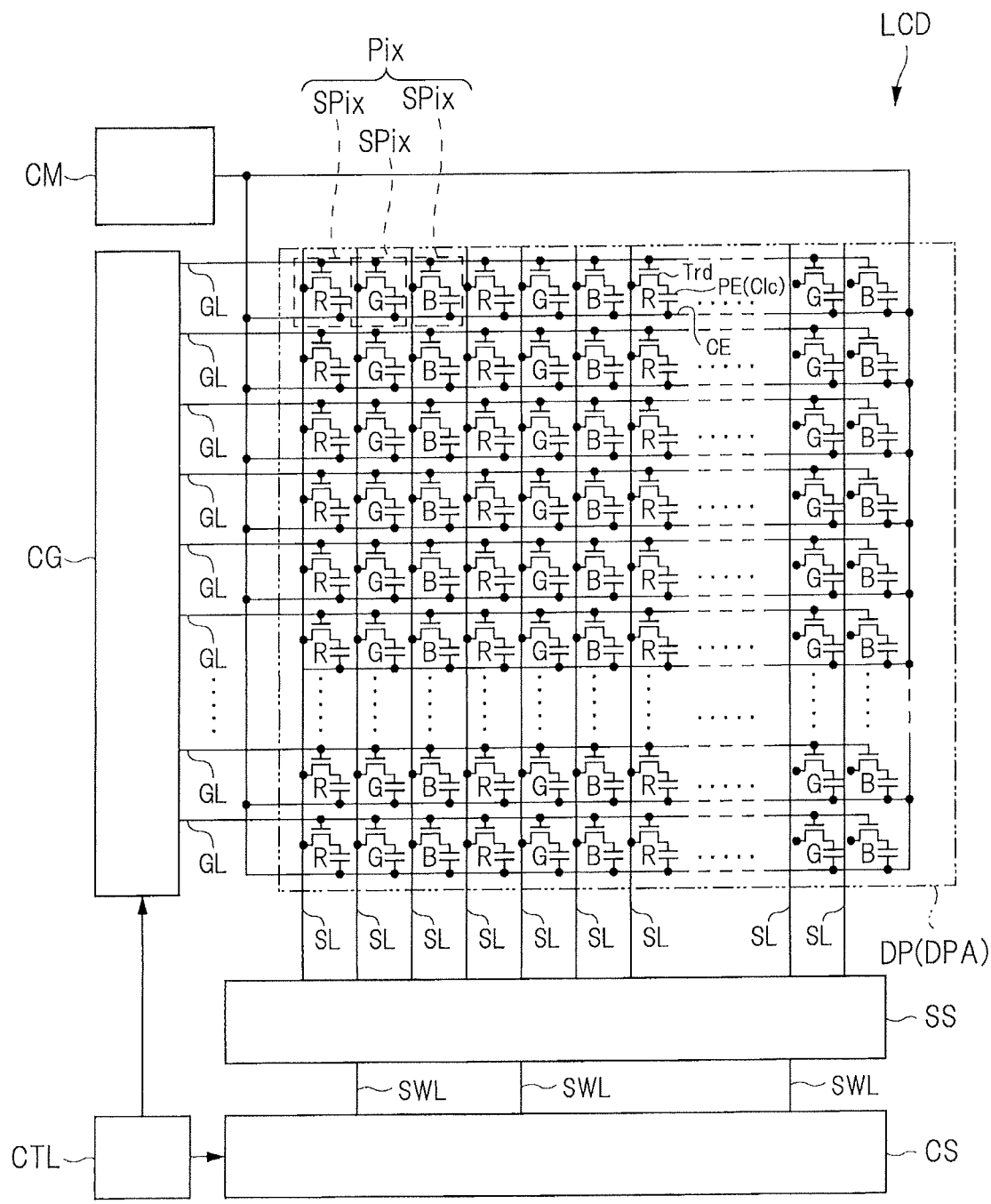
FIG. 4 is a diagram illustrating an example of an equivalent circuit of the display device according to the embodiment.

As illustrated in FIG. 4, the display section DP in the display device LCD includes the plurality of pixels Pix. The plurality of pixels Pix are provided on the array substrate BS within the display region DPA and are arranged in a matrix shape in the X-axis direction and the Y-axis direction in a plan view.

In addition, the display device LCD includes the plurality of scanning signal lines GL and the plurality of video signal lines SL. The plurality of scanning signal lines GL are provided on the array substrate BS (see, e.g., FIG. 2) in the display region DPA, each extend in the X-axis direction, and are arranged in the Y-axis direction. The plurality of video signal lines SL are provided on the array substrate BS within the display region DPA, each extend in the Y-axis direction, and are arranged in the X-axis direction. The plurality of video signal lines SL and the plurality of scanning signal lines GL intersect each other.

Each of the plurality of pixels Pix includes sub-pixels SPix which display respective colors of red (R), green (G), and blue (B). Each of the sub-pixels SPix is provided in a region surrounded by the two adjacent scanning signal lines GL and the two adjacent video signal lines SL, but may have another configuration.

Each of the sub-pixels SPix has a transistor Trd composed of a thin film transistor, a pixel electrode PE connected to a drain electrode of the transistor Trd, and a common electrode CE opposing the pixel electrode PE with a liquid crystal layer sandwiched therebetween. Incidentally, in FIG. 4, a liquid crystal capacitance equivalently representing the liquid crystal layer, and a retentive capacitance formed between the common electrode CE and the pixel electrode PE are each indicated as a capacitance Clc. Incidentally, the drain electrode and a source electrode of the transistor Trd are appropriately replaced with each other depending on a polarity of a potential.

The driving circuit CC (see FIG. 1) in the display device LCD includes a video signal line driving circuit CS, a video signal line selection circuit SS, a scanning signal line driving circuit CG, a control circuit CTL, and a common electrode driving circuit CM. The video signal line driving circuit CS, the control circuit CTL, and the common electrode driving circuit CM are provided within the semiconductor chip CHP mounted on the lower frame region FLA1. The video signal line selection circuit SS is provided between the display region DPA and the semiconductor chip CHP in the lower frame region FLA1. The scanning signal line driving circuit CG is provided in each of the left frame region FLA3 and the right frame region FLA4.

Incidentally, the control circuit CTL and the common electrode driving circuit CM may be formed not within the semiconductor chip CHP but directly on the array substrate BS. In the case, the control circuit CTL and the common electrode driving circuit CM are arranged between the seal SEL and the display region DPA, the seal existing in the left frame region FLA3, the right frame region FLA4, and the lower frame region FLA1.

The respective source electrodes of the transistors Trd in the plurality of sub-pixels SPix arranged in the Y-axis direction are connected to the video signal line SL. In addition, each of the video signal lines SL is connected to the video signal line driving circuit CS passing through a video signal wiring SWL via the video signal line selection circuit SS. The video signal line selection circuit SS and the video signal line driving circuit CS are connected to each other via the video signal wirings SWL. The video signal line driving circuit CS feeds a video signal to each of the video signal lines SL. The video signal line selection circuit SS selects each of the video signal lines SL, and feeds, to the selected video signal line SL, the video signal from the video signal line driving circuit CS.

In addition, respective gate electrodes of the transistors Trd in the plurality of sub-pixels SPix arranged in the X-axis direction are connected to the scanning signal line GL. In addition, each of the scanning signal lines GL is connected to the scanning signal driving circuit CG. The scanning signal line driving circuit CG feeds a scanning signal to each of the scanning signal lines GL, and scans each scanning signal line GL.

The control circuit CTL controls the video signal line driving circuit CS, the scanning signal line driving circuit CG, and the common electrode driving circuit CM based on display data and display control signals such as a clock signal and a display timing signal, the display data and the display control signals being transmitted from outside the display device LCD.

The control circuit CTL converts appropriately the display data and the display control signals fed from outside depending on an array of the sub-pixels SPix in the display device LCD, a display method, presence or absence of an RGB switch (not illustrated), and presence or absence of a touch panel (not illustrated), etc., and outputs the converted display data and display control signals to the video signal line driving circuit CS, the scanning signal line driving circuit CG, and the common electrode driving circuit CM.

<Reconnection Structure for Video Signal Wiring>

Then, a reconnection structure for a video signal wiring will be described with reference to FIGS. 5 to 7 and FIGS. 10 and 11. Here, a characteristic of the present embodiment will be described to make it easy to understand it while being compared with that of a comparative example.

Figure 10:
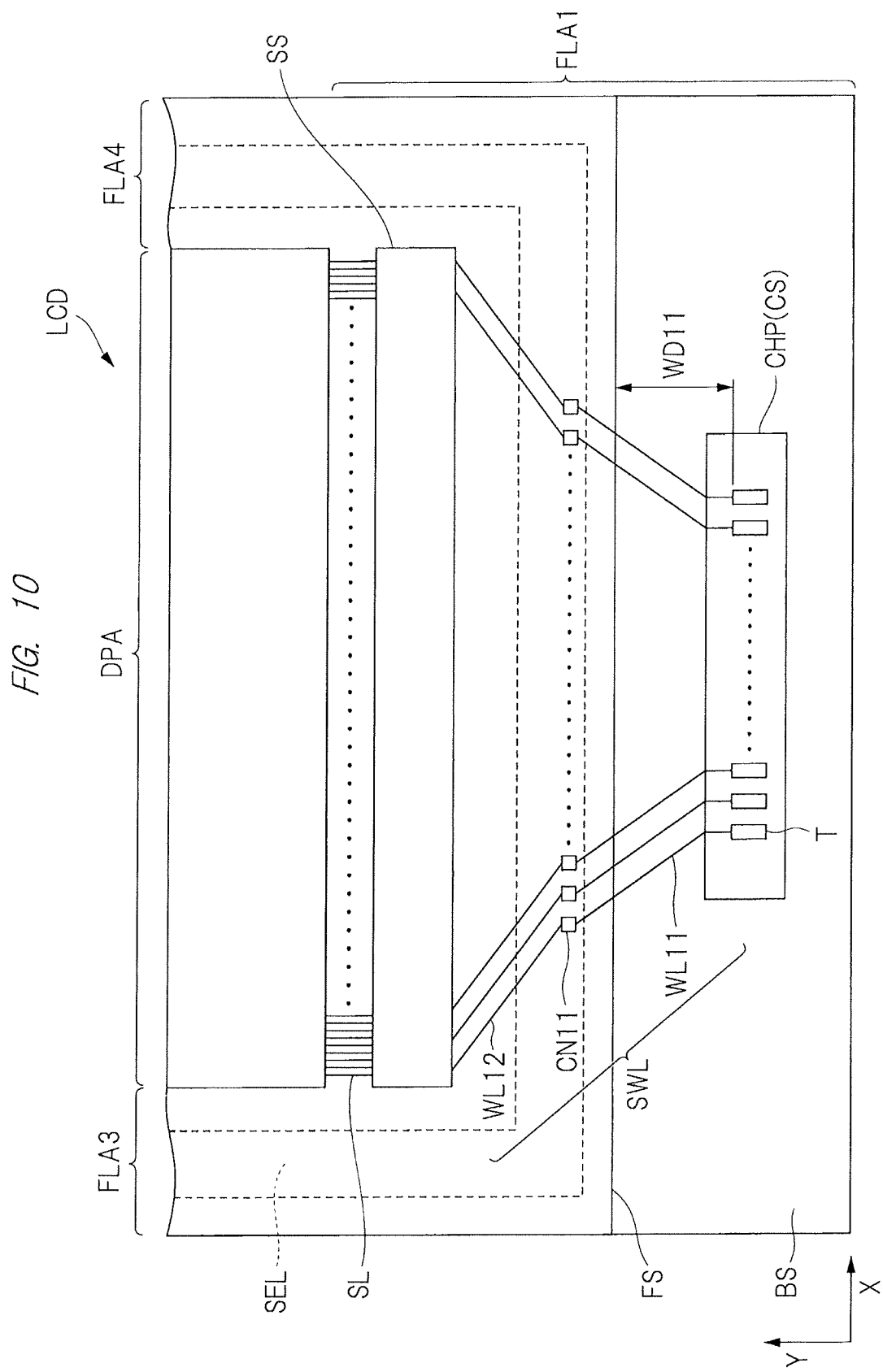
FIG. 10 is an explanatory diagram illustrating a conventional reconnection structure for a video signal wiring in a comparative example of the display device according to the embodiment.
Figure 11:
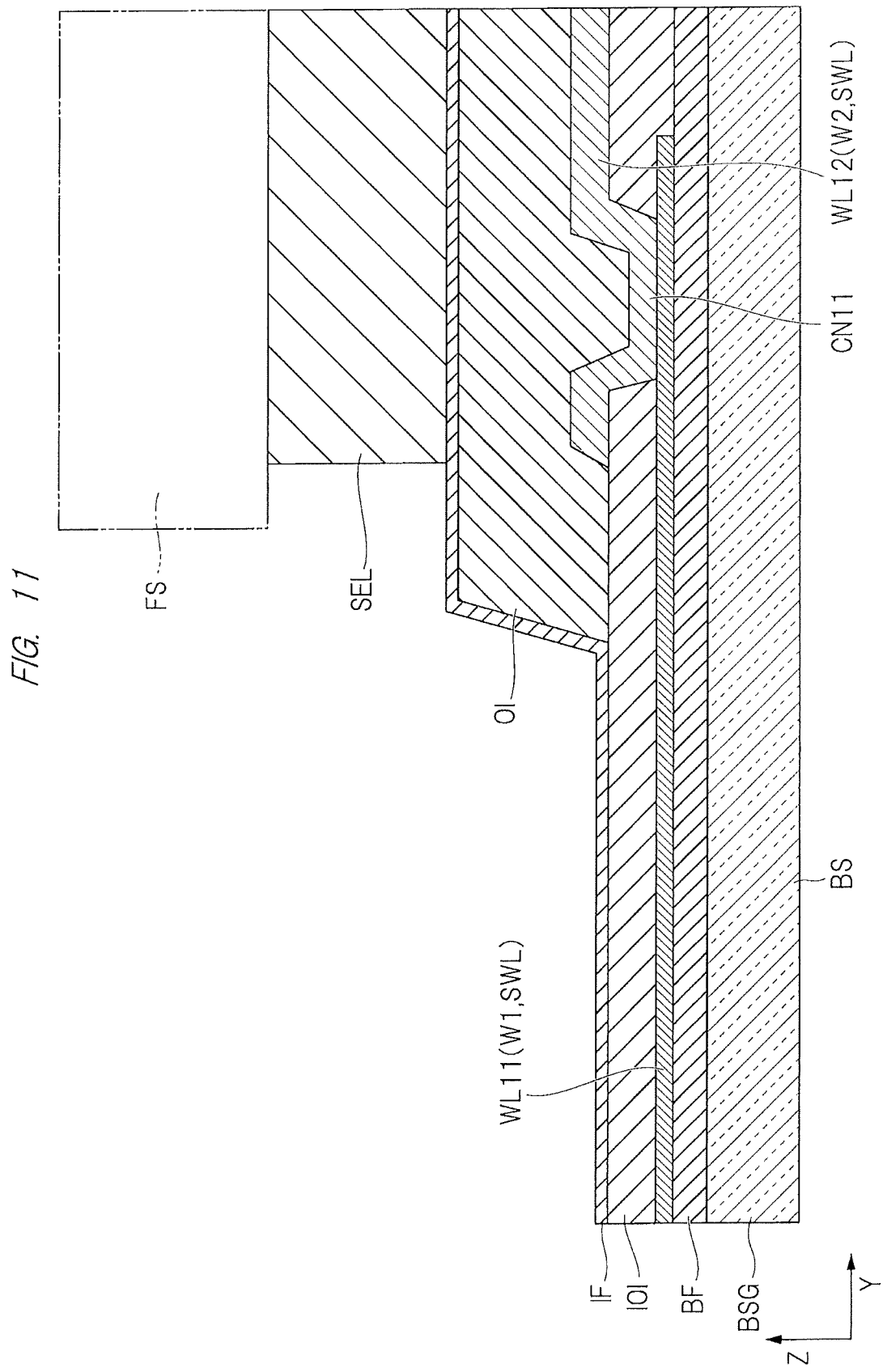
FIG. 11 is a cross-sectional view illustrating the conventional reconnection structure for the video signal wiring in the comparative example of the display device according to the embodiment.

First, in the comparative example of the display device according to the present embodiment, a conventional reconnection structure for a video signal wiring will be described with reference to FIGS. 10 and 11. FIGS. 10 to 11 are diagrams for explaining the comparative example of the display device according to the embodiment, where FIG. 10 is an explanatory diagram illustrating the conventional reconnection structure for the video signal wiring, and FIG. 11 is a cross-sectional view illustrating the conventional reconnection structure for the video signal wiring. FIG. 10 corresponds to FIG. 5 illustrating the present embodiment, and FIG. 11 corresponds to FIG. 7 illustrating the present embodiment.

As illustrated in FIGS. 10 and 11, in the display device in the comparative example, a plurality of video signal wirings SWL electrically connected to a plurality of video signal lines SL are arranged within a lower frame region FLA1 on a lower side of a display region DPA, and a semiconductor chip CHP including a video signal line driving circuit CS for feeding a video signal to the plurality of video signal lines SL passing through the plurality of video signal wirings SWL is mounted thereon. The semiconductor chip CHP is mounted on a region in the lower frame region FLA1, the region falling within an array substrate BS and not overlapping an opposite substrate FS.

The array substrate BS includes, for example, a base film BF, a first wiring layer W1, an inorganic insulating film IOI, a second wiring layer W2, an organic insulating film OI, and an inorganic insulating film IF on a glass substrate BSG. For example, the first wiring layer W1 is a metal layer on which scanning signal lines GL are arranged, and the second wiring layer W2 is a metal layer on which the video signal lines SL are arranged.

The video signal wiring SWL connected to the video signal lines SL from the semiconductor chip CHP including the video signal line driving circuit CS includes a first wiring WL11 in a region between the semiconductor chip CHP including the video signal line driving circuit CS and a seal SEL. The first wiring WL11 is a wiring formed on the first wiring layer W1 and having one end connected to a terminal T on which the semiconductor chip CHP including the video signal line driving circuit CS is mounted. The other end of the first wiring WL11 is connected to the video signal lines SL passing through a second wiring WL12 formed on the second wiring layer W2. In the first wiring WL11 and the second wiring WL12, the first wiring WL11 and the second wiring WL12 are connected to each other passing through a contact section CN11 of an opening formed in the organic insulating film IOI.

Thus, the video signal wiring SWL from the semiconductor chip CHP including the video signal line driving circuit CS is arranged in the first wiring layer W1 in a region not overlapping, in the array substrate BS, the opposite substrate FS. The video signal wiring SWL in a region where the array substrate BS and the opposite substrate FS overlap each other and in a portion of arranging the organic insulating film OI on the second wiring layer W2.

That is, the video signal wiring SWL in the lower frame region FLA1 in the comparative example illustrated in FIGS. 10 and 11 is drawn around by a wiring (s) on the first wiring layer W1 from the terminal T to an overlapping region of the array substrate BS and the opposite substrate FS, the semiconductor chip CH including the video signal line driving circuit CS being connected to the terminal T, the scanning signal line GL being arranged on the first wiring layer W1. The wiring on the first wiring layer W1 on which the scanning signal lines GL are arranged is not appropriate in making a wiring width minute because of a metal material to be used (a specific example will be described below). Thus, if the number of pixels in the display region increases and the number of video signal lines increases, a larger region is required to draw the wiring around, so that the lower frame region FLA1 is difficult to narrow in size.

Incidentally, as measures taken when the number of wirings have increased, there is also an example in which the first wiring WL11 and the second wiring WL12 are alternately used in a plan view to make the video signal wiring SWL a two-layer structure. However, in this case, the organic insulating film OI requires being extended to the vicinity of the terminal T to cover the second wiring WL12 present on the upper layer. Meanwhile, since the organic insulating film OI easily contains water, there are problems as follows: the second wiring WL12 contacting with the organic insulating film OI easily corrodes in a region outside the seal SEL; and further the corrosion propagates also to the second wiring WL12 within the seal SEL through the organic insulating film OI. In addition, the same first wiring layer W1 that the scanning signal lines GL are arranged on is still used unchangeably, so that a large region for drawing the wirings around remains required, which makes it difficult to narrow the lower frame region FLA in size.

With respect to the above-described comparative example, the inventors of the present application have considered applying only the wiring WL12 on the second wiring layer W2 to the video signal wiring SWL to reduce the size of the lower frame region FLA1, the video signal line SL suitable for miniaturization due to an array process being arranged on the second wiring layer W2 from the semiconductor chip CH to the overlapping region of the array substrate BS and the opposite substrate FS, the semiconductor chip CH including the video signal line driving circuit CS. In addition, the inventors have considered arranging the first wiring layer W1 to ensure a wiring corrosion margin equivalent or similar to that of the comparative example, the organic insulating film OI being removed from the periphery of the end of the opposite substrate FS, the scanning signal line GL being arranged as the video signal wiring SL corresponding to this removed portion and on the first wiring layer W1.

Therefore, the present embodiment has been made to solve the above-described problems about the comparative example, and has an object of reducing the size of the lower frame region FLA1 to ensure the wiring corrosion margin equivalent to that of the comparative example.

In the display device LCD according to the present embodiment, a reconnection structure for the video signal wiring SWL will be described below with reference to FIGS. 5 to 7. FIGS. 5 to 7 are diagrams for explaining the display device according to the embodiment; FIG. 5 is an explanatory diagram illustrating an example of the reconnection structure for the video signal wiring SWL; FIG. 6 is a plan view illustrating an example of the reconnection structure for the video signal wiring SWL; and FIG. 7 is a cross-sectional view taken along line C-C' illustrated in FIG. 6.

Figure 5:
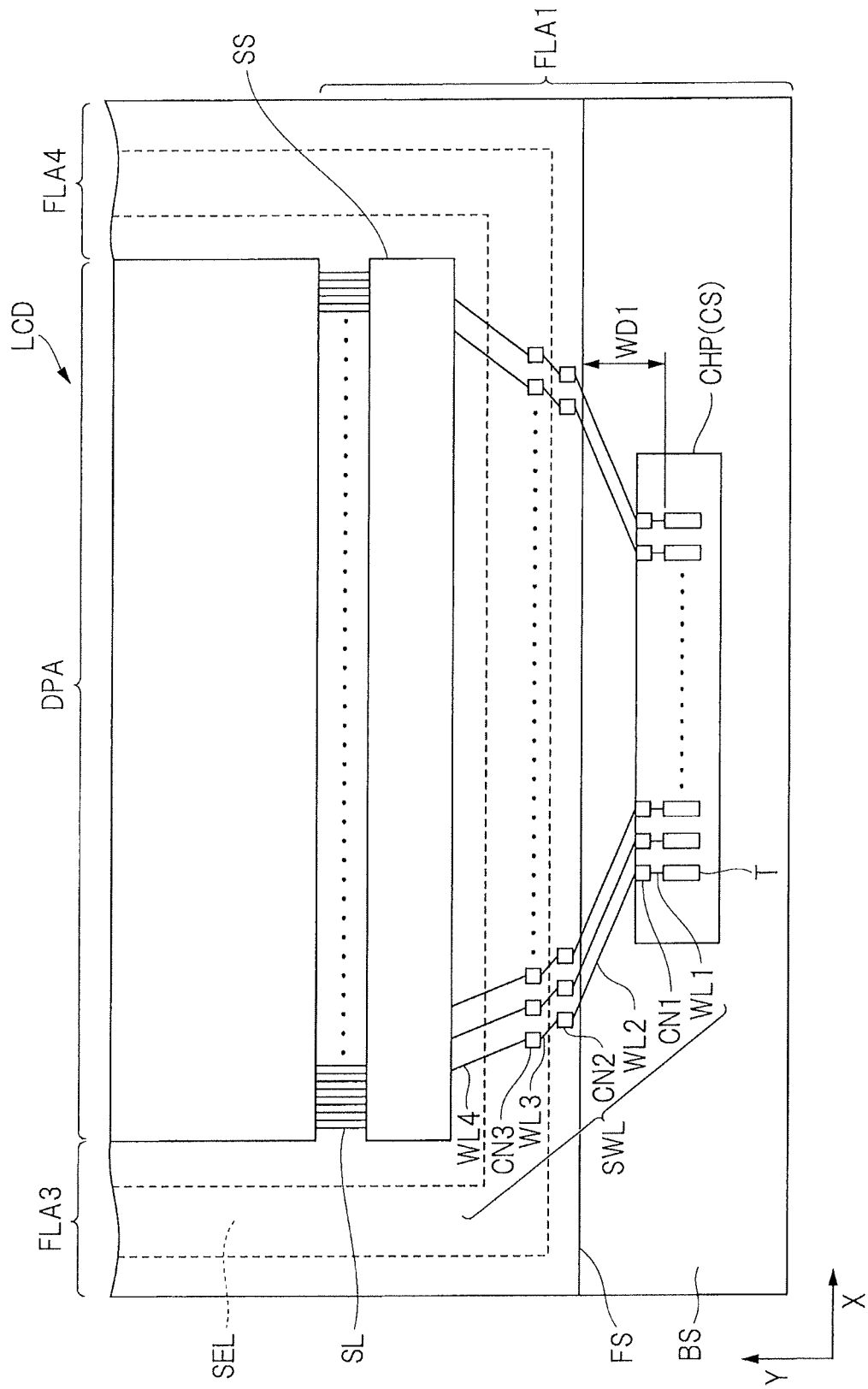
FIG. 5 is an explanatory diagram illustrating an example of a reconnection structure for a video signal wiring in the display device according to the embodiment.

FIG. 5 illustrates the lower frame region FLA1 existing on the lower side of the display region DPA. The lower frame region FLA1 includes, in the array substrate BS, a region overlapping the opposite substrate FS, and a region not overlapping the opposite substrate FS. A boundary between the region overlapping the opposite substrate FS and the region not overlapping the opposite substrate FS becomes an end of the opposite substrate FS. In the array substrate BS, the video signal line selection circuit SS is provided in the region overlapping the opposite substrate FS. In the array substrate BS, the semiconductor chip CHP including the video signal line driving circuit CS is mounted on the region not overlapping the opposite substrate FS. The video signal line selection circuit SS and the semiconductor chip CHP including the video signal line driving circuit CS are connected to each other via the video signal wirings SWL. FIGS. 6 and 7 illustrates the video signal wirings SWL connecting the video signal line selection circuit SS and the semiconductor chip CHP including the video signal line driving circuit CS.

Figure 6:
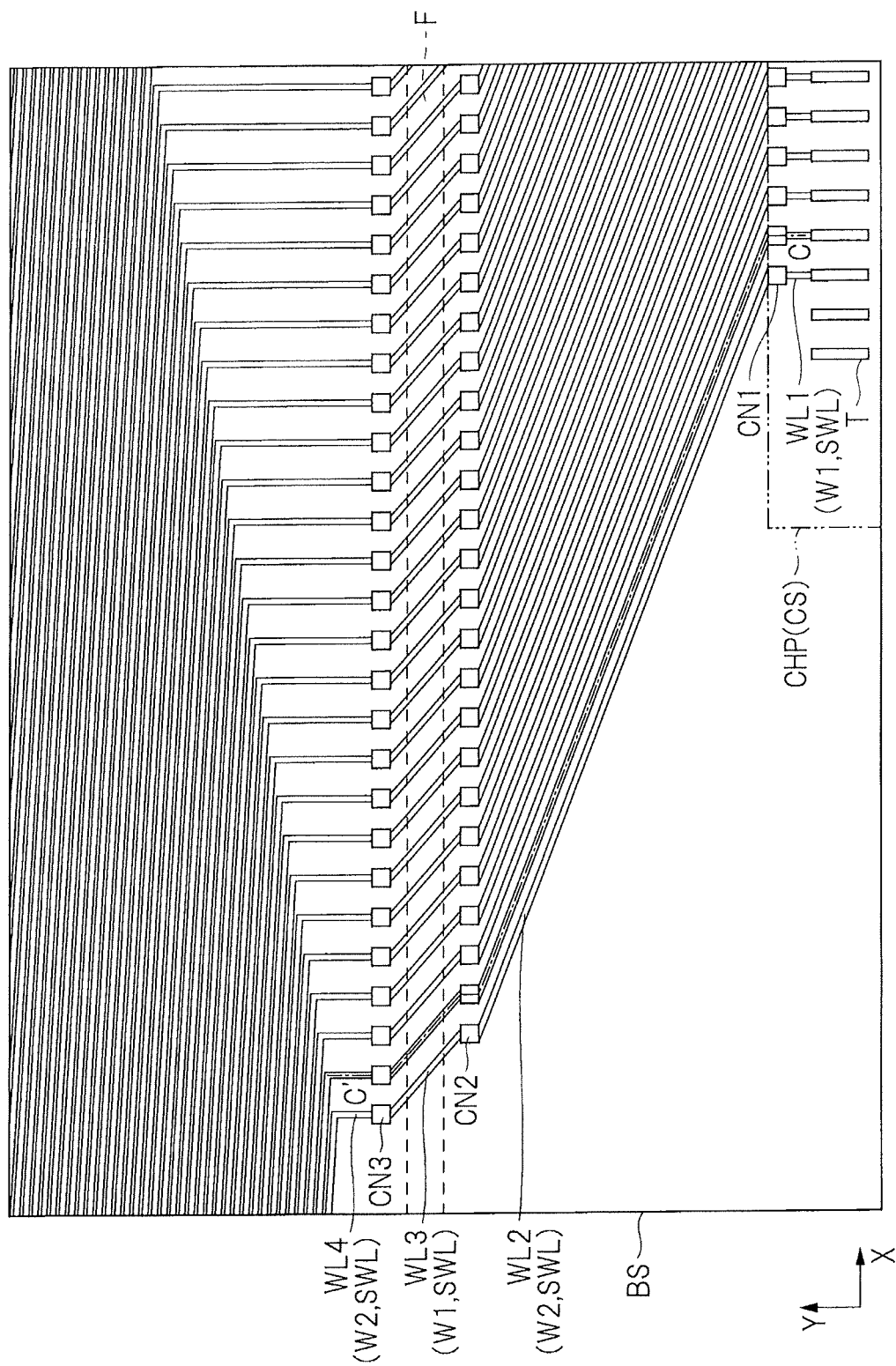
FIG. 6 is a plan view illustrating an example of the reconnection structure for the video signal wiring in the display device according to the embodiment.
Figure 7:
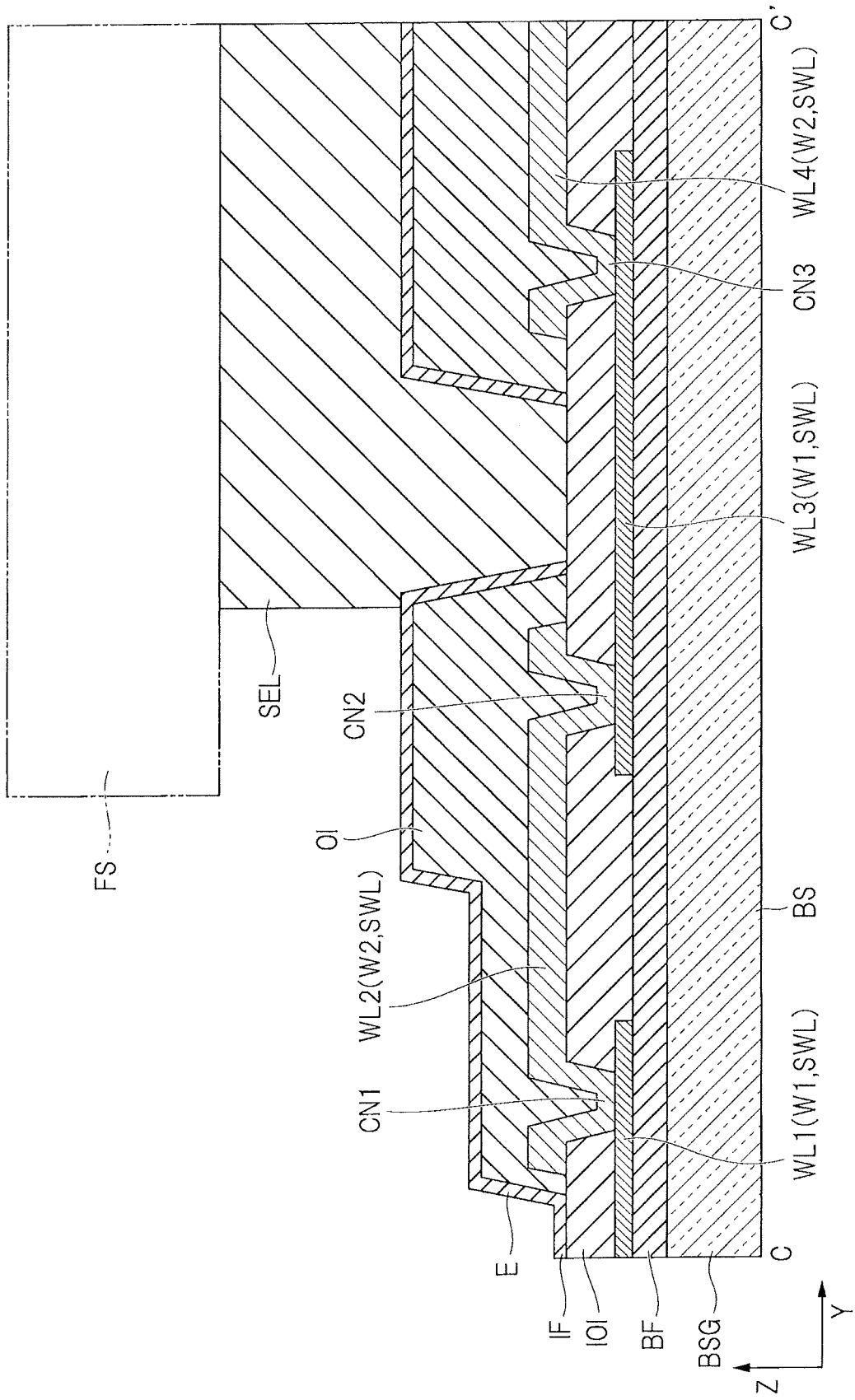
FIG. 7 is a cross-sectional view taken along line C-C' illustrated in FIG. 6.

As illustrated in FIGS. 5 to 7 (also see FIGS. 1 to 4 described above), the display device LCD according to the present embodiment includes the array substrate (first substrate) BS, the opposite substrate (second substrate) FS arranged opposite the array substrate BS, and the seal SEL provided between the array substrate BS and the opposite substrate FS and making the array substrate BS and the opposite substrate FS adhere to each other.

The array substrate BS includes the display region DPA, and the lower frame region FLA1 arranged on the lower side of the display region DPA in the Y-axis direction in a plan view. In addition, as illustrated in FIG. 1, the array substrate BS includes, in a plan view, the upper frame region FLA2 arranged on the upper side of the display region DPA in the Y-axis direction, and the left frame region FLA3 and the right frame region FLA4 respectively arranged on the left side and the right side of the display region DPA in the X-axis direction.

The seal SEL is arranged to continuously surround the display region DPA within the frame region FLA that includes the lower frame region FLA1, the upper frame region FLA2, the left frame region FLA3, and the right frame region FLA4. The seal SEL adhesively fixes the array substrate BS and the opposite substrate FS by using a sealing material.

The plurality of pixels Pix, the plurality of scanning signal lines GL, and the plurality of video signal lines SL are arranged within the display region DPA. The plurality of video signal wirings SWL electrically connected to the plurality of video signal lines SL and the plurality of terminal sections (terminals T) for respectively feeding the video signals to the plurality of video signal wirings SWL are arranged within the lower frame region FLA1. The semiconductor chip CHP, which includes the video signal line driving circuit CS for feeding the video signals to the plurality of video signal lines SL passing through the plurality of video signal wirings SWL, is mounted on the plurality of terminal sections. The semiconductor chip CHP is mounted on the lower frame region FLA1 and on the region not overlapping the opposite substrate FS in the array substrate BS.

The array substrate BS includes a base film BF, a first wiring layer W1, an inorganic insulating film IOI, a second wiring layer W2, an organic insulating film OI, and an inorganic insulating film IF on a glass substrate BSG, for example. In the array substrate BS, the base film BF is provided on the glass substrate BSG. The first wiring layer W1 is provided on the base film BF. Each wiring on the first wiring layer W1 is covered with the inorganic insulating film IOI. The second wiring layer W2 is provided on the first wiring layer W1. Each wiring on the second wiring layer W2 is covered with the organic insulating film OI. The inorganic insulating film IF is provided on the organic insulating film OI. The inorganic insulating film IF may be formed of a transparent insulating film (ITO, IZO, etc.). The organic insulating film OI has an end surface E in the region not overlapping the opposite substrate FS on the array substrate BS. The inorganic insulating film IF is formed to also cover the end surface E of the organic insulating film OI.

For example, the first wiring layer W1 is a metal layer on which the scanning signal lines GL are arranged, and the second wiring layer W2 is a metal layer on which the video signal lines SL are arranged. That is, in the display region DPA, the plurality of scanning signal lines GL each electrically connected to the plurality of pixels Pix are arranged in the first wiring layer W1 over the array substrate BS, and the plurality of video signal lines SL each electrically connected to the plurality of pixels Pix are arranged in the second wiring layer W2 over the array substrate BS.

The video signal wiring SWL, which is electrically connected to the video signal lines SL from the semiconductor chip CHP including the video signal line driving circuit CS, includes a first wiring WL1, a second wiring WL2, and a third wiring WL3 in a region between the video signal line driving circuit CS and the seal SEL, i.e., between the semiconductor chip CHP including the video signal line driving circuit CS and the seal SEL, for example. The first wiring WL1 is a wiring formed on the first wiring layer W1 and having one end connected to the terminal T on which the semiconductor chip CHP including the video signal line driving circuit CS is mounted. The second wiring WL2 is a wiring formed on the second wiring layer W2 different from the first wiring layer W1 and having one end connected to the other end of the first wiring WL1. The third wiring WL3 is a wiring formed on the first wiring layer W1 and having one end connected to the other end of the second wiring WL2. The other end of the third wiring WL3 is connected to the video signal lines SL passing through a fourth wiring WL4 formed on the second wiring layer W2.

In the first wiring WL1, the second wiring WL2, the third wiring WL3, and the fourth wiring WL4, the first wiring WL1 and the second wiring WL2 are connected to each other via a contact section CN1 in an opening formed in the inorganic insulating film IOI; the second wiring WL2 and the third wiring WL3 are connected to each other via a contact section CN2 in an opening formed in the inorganic insulating film IOI; and the third wiring WL3 and the fourth wiring WL4 are connected to each other via a contact section CN3 in an opening formed in the inorganic insulating film IOI.

That is, the video signal wiring SWL is structured to be electrically connected to the video signal line SL via the first wiring WL1, the contact section CN1, the second wiring WL2, the contact section CN2, the third wiring WL3, the contact section CN3, and the fourth wiring WL4 from the terminal T on which the semiconductor chip CHP including the video signal line driving circuit CS is mounted.

Thus, the video signal wiring SWL from the semiconductor chip CHP including the video signal line driving circuit CS is connected to the second wiring layer W2 from the first wiring layer W1 in the region not overlapping the opposite substrate FS and in the array substrate BS. Further, a portion of the organic insulating film OI is removed from the periphery of the end of the opposite substrate FS, and the seal SEL is arranged on the inorganic insulating film IOI. Further, the video signal wiring SWL in a region, in which the array substrate BS and the opposite substrate FS overlap each other and which has the removed portion F of the organic insulating film OI, is arranged on the first wiring layer W1. The video signal wiring SWL is arranged on the second wiring layer W2 inside the seal SEL and in a portion on which the organic insulating film OI is arranged.

That is, by reconnecting the first wiring WL1 and the third wiring WL3 formed on the first wiring layer W1 and the second wiring WL2 and the fourth wiring WL4 formed on the second wiring layer W2 to each other, the measures against corrosion are taken about the video signal wiring SWL in the lower frame region FLA1 in the present embodiment illustrated in FIGS. 5 to 7, and the wirings in the second wiring layer W2 whose pitch can be made minute by a fine processing can be applied in a wider range. More specifically, since the second wiring WL2 is used to thin the wirings, a slope of the second wiring WL2 can be made steep in a space WD1 between the terminal T on which the semiconductor chip CHP is mounted and the end of the opposite substrate FS. Thus, positions of the contact sections CN2 and CN3 can be arranged on an end side (a position close to the frame regions FLA3 and FLA4 in FIG. 5) of the array substrate BS. As a result, a slope of the fourth wiring WL4 can be made gentle, and a size of the fourth wiring WL4 in a longitudinal direction (a direction along an extension direction of the video signal lines SL) can be reduced. Thus, the size of the lower frame region FLA1 can be reduced in total. If the display device LCD includes a display region having a size of 5.45 inches and having the number of pixels of Wide Quad-HD (WQHD), for example, the size of the lower frame region FLA1 can be reduced approximately 5% smaller than that of the comparative example illustrated in FIG. 10.

In addition, even in the display device LCD of another size, the lower frame region FLA1 can be reduced substantially 3 to 10% smaller.

In addition, in the display device LCD according to the present embodiment, as illustrated in FIG. 7, the second wiring WL2 and the fourth wiring WL4 formed on the second wiring layer W2 are covered with the organic insulating film OI made of an organic material. Further, the organic insulating film OI is not arranged and the seal SEL is arranged in a region between the second wiring WL2 covered with the organic insulating film OI and the fourth wiring WL4 covered with the organic insulating film OI. On the other hand, the first wiring WL1 and the third wiring WL3 formed on the first wiring layer W1 are covered with the inorganic insulating film IOI made of an inorganic material. Thus, a region where the organic insulating film OI easily containing water is not arranged, i.e., a region where the organic insulating film OI is removed (a non-formation region of the organic insulating film OI) is formed in a region overlapping the seal SEL, so that water can be prevented from penetrating through and inside the organic insulating film OI, and the wiring corrosion margin equivalent to that of the comparative example can be ensured. Incidentally, an example in which a film thickness of the organic insulating film OI can be reduced in the region not overlapping the opposite substrate FS in the array substrate BS is illustrated in FIG. 7, but the film thickness does not necessarily need being reduced.

In addition, in the display device LCD according to the present embodiment, as illustrated in FIG. 5, the video signal line selection circuit SS, which selects the video signal lines SL and to which the video signal from the video signal wiring SWL is applied, is arranged in the region between the terminal T to which the semiconductor chip CHP including the video signal line driving circuit CS is connected and the display region DPA in a plan view within the lower frame region FLA1. For example, a video signal to be applied to the three video signal lines SL from the single video signal wiring SWL flows in a time series manner, and a switch of the video signal line selection circuit SS is appropriately made about which of the video signal lines SL the video signal is to be applied to from the video signal wiring SWL. By the video signal line selection circuit SS, the number of video signal wirings SWL within the lower frame region FLA1 can be made fewer than the number of video signal lines SL. The video signal line SWL arranged within the lower frame region FLA1 includes the first wiring WL1, the second wiring WL2, the third wiring WL3, and the fourth wiring WL4 in a region between the semiconductor chip CHP including the video signal line driving circuit CS and the video signal line selection circuit SS in a plan view. Therefore, the lower frame region FLA1, particularly a region between the semiconductor chip CHP including the video signal line driving circuit CS and the display region DPA, can be reduced.

In addition, regarding the first wiring WL1, the second wiring WL2, the third wiring WL3, and the fourth wiring WL4, a material for the first wiring WL1 and the third wiring WL3 formed on the first wiring layer W1 and a material for the second wiring WL2 and the fourth wiring WL4 formed on the second wiring layer W2 differ from each other. For example, used as the material for the first wiring WL1 and the third wiring WL3 is molybdenum (Mo) metal, and used as the material for the second wiring WL2 and the fourth wiring WL4 is metal of a stacked film made of titanium (Ti)/aluminum (Al)/titanium (Ti).

The Mo metal serving as the material for the first wiring WL1 and the third wiring WL3 has a specific resistance of $5.6 \times 10^{-8}$ $\Omega$m (a temperature of 20° C.). On the other hand, in the stacked film of Ti/Al/Ti serving as the material for the second wiring WL2 and the fourth wiring WL4, Al serving as its main material has a specific resistance of $2.75 \times 10^{-8}$ $\Omega$m (a temperature of 20° C.). Thus, the specific resistance of the material for the second wiring WL2 and the fourth wiring WL4 is lower than the specific resistance of the material for the first wiring WL1 and the third wiring WL3. Incidentally, a specific resistance of a material for a wiring is a specific resistance of a main material if the wiring is a stacked film made of a plurality of materials.

In addition, the first and third wirings WL1 and WL3, and the second and fourth wirings WL2 and WL4 may differ from each other in thickness, line width, wiring density, and the like. That is, the second wiring WL2 and the fourth wiring WL4 are formed on the second wiring layer W2 on which the video signal lines SL are arranged, so that each pitch of the second wiring WL2 and the fourth wiring WL4 on the second wiring layer W2 can be narrowed by the array process suitable for miniaturization. As illustrated in FIG. 7, for example, each thickness of the second wiring WL2 and the fourth wiring WL4 is made larger than each thickness of the first wiring WL1 and the third wiring WL3. Each line width of the second wiring WL2 and the fourth wiring WL4 may be made smaller than each line width of the first wiring WL1 and the third wiring WL3. Each wiring density of the second wiring WL2 and the fourth wiring WL4 may be structurally made higher than each wiring density of the first wiring WL1 and the third wiring WL3.

By the display device LCD according to the present embodiment described above, the wirings on the second wiring layer W2 whose pitch can be narrowed by a fine processing can be used as the video signal wiring SWL to the end of the opposite substrate FS from the semiconductor chip CHP in the lower frame region FLA. Further, by reconnecting the wirings in the video signal wirings SWL to each other in the region where the organic insulating film OI is not arranged, the size of the lower frame region FLA1 can be reduced and the wiring corrosion margin equivalent to that of the comparative example can be ensured.

<Structure of Terminal on which Semiconductor Chip is Mounted>

Figure 8:
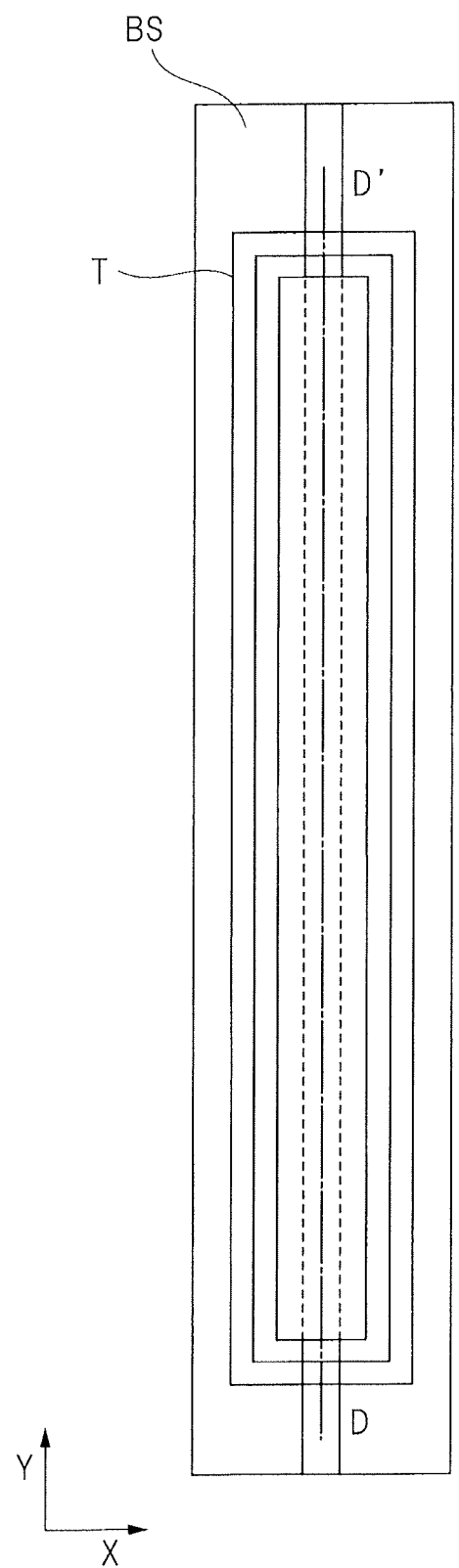
FIG. 8 is a plan view illustrating an example of a structure of a terminal, on which a semiconductor chip is mounted, in the display device according to the embodiment.
Figure 9:
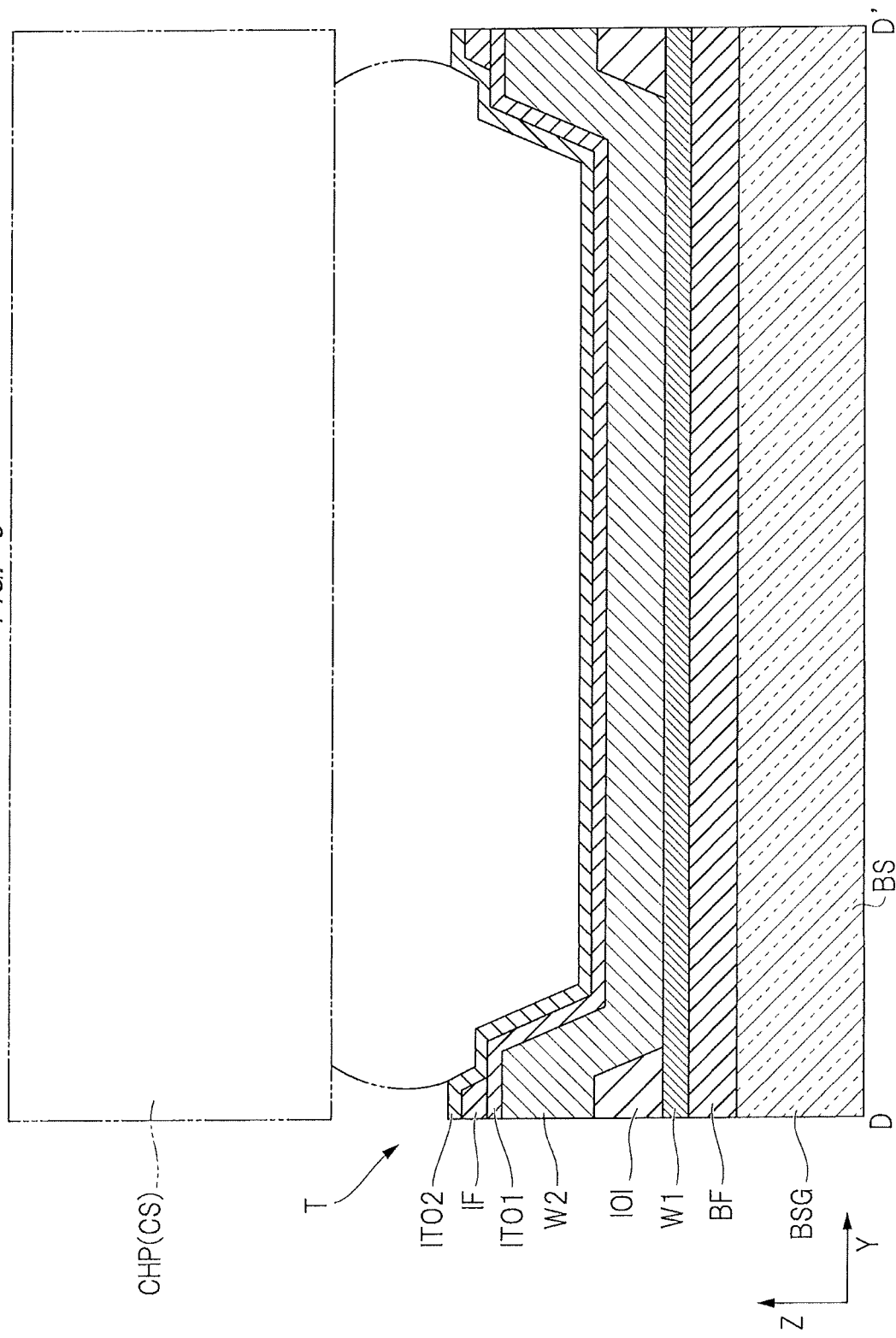
FIG. 9 is a cross-sectional view taken along line D-D' illustrated in FIG. 8.

Then, a structure of a terminal on which a semiconductor chip is mounted will be described with reference to FIGS. 8 and 9. FIG. 8 is a plan view illustrating an example of a structure of a terminal, on which a semiconductor chip is mounted, in a display device according to the embodiment. One of a plurality of terminals on which the semiconductor chip is mounted is illustrated in FIG. 8. FIG. 9 is a cross-sectional view taken along line D-D' illustrated in FIG. 8.

In the display device LCD according to the present embodiment, the terminal T on which the semiconductor chip CHP is mounted is arranged in the region not overlapping the opposite substrate FS and in the array substrate BS. A structure of the terminal T on which the semiconductor chip CHP is mounted includes, as illustrated in FIGS. 8 and 9, a base material BF, a first wiring layer W1, an inorganic insulating film IOI, a second wiring layer W2, a first conductive film ITO1, an inorganic insulating film IF, and a second conductive film ITO2 on a glass substrate BSG, for example, in the array substrate BS. The terminal T has a stacked structure of a first wiring layer W1, a second wiring layer W2, a first conductive film ITO1, and a second conductive film ITO2. The semiconductor chip CHP is mounted, via a solder or the like, on the second conductive film ITO2 in the stacked structure of the terminal T. Incidentally, the first conductive film ITO1 does not necessarily need being stacked on the structure of the terminal T by the array process.

In FIGS. 8 and 9, a region on a D' side of the line D-D' in the array substrate BS is a region overlapping the opposite substrate FS, and the region on the D' side of the line D-D' illustrated in FIGS. 8 and 9 is connected to a region on the side of C of the line C-C' illustrated in FIGS. 6 and 7. That is, the terminal T on which the semiconductor chip CHP is mounted is connected to the above-described video signal wiring SWL. In this case, in the stacked structure of the terminal T, the wiring extracted from the first wiring layer W1 becomes the above-described video signal wiring SWL.

By the display device LCD according to the present embodiment, described above, the stacked structure of the terminal T on which the semiconductor chip CHP is mounted has such a structure that the wiring extracted from the first wiring layer W1 becomes the video signal wiring SWL and is connected to the video signal line SL passing through the first wiring WL1, the contact section CN1, the second wiring WL2, the contact section CN2, the third wiring WL3, the contact section CN3, and the fourth wiring WL4 illustrated in FIGS. 5 to 7.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, the liquid crystal display device has been exemplified as a disclosure example in the above-described embodiment, but other applicable examples include an organic EL display device, other self-luminous display devices, and all flat panel display devices such as an electronic paper display device having an electrophoresis element(s).

A person having an ordinary skill in the art can make various modification examples and correction examples within a scope of the idea of the present invention, and it is interpreted that the modification examples and the correction examples also belong to the scope of the present invention.

For example, the examples obtained by performing addition or elimination of components or design change or the examples obtained by performing addition or reduction of process or condition change to the embodiment described above by a person having an ordinary skill in the art are also included in the scope of the present invention as long as they include the gist of the present invention.

What is claimed is:

1. A display device including, on a first substrate, a display region and a frame region formed around the display region in a plan view, the display device comprising:
   a plurality of pixels, a plurality of scanning signal lines, and a plurality of video signal lines arranged in the display region; and
   a plurality of video signal wirings electrically connected to the plurality of video signal lines, and a plurality of terminal sections for feeding a video signal to the plurality of video signal wirings, the video signal wirings and the terminal sections being arranged in the frame region,
   wherein in a region between each of the terminal sections and each of the video signal lines, each of the video signal wirings arranged in the frame region comprises:
   a first wiring formed on a first wiring layer and having one end connected to a terminal to which a driving circuit is connected;
   a second wiring formed on a second wiring layer different from the first wiring layer and having one end connected to the other end of the first wiring; and
   a third wiring formed on the first wiring layer and having one end connected to the other end of the second wiring,
   the other end of the third wiring is connected to the video signal lines via a fourth wiring formed on the second wiring layer,
   the first wiring layer is formed on a side closer to the first substrate than to the second wiring layer, an organic insulating film is formed to cover the second wiring and the fourth wiring opposite to the first substrate side, and a non-formation region of the organic insulating film is arranged between a formation region of the second wiring and a formation region of the fourth wiring.

2. The display device according to claim 1, wherein the first wiring layer is a layer on which the plurality of scanning signal lines are arranged, and the second wiring layer is a layer on which the plurality of video signal lines are arranged.

3. The display device according to claim 1, wherein opposite surfaces of the first wiring and the third wiring to the first substrate are covered with an inorganic insulating film, and connections between the first and second wirings, between the second and third wirings, and between the third and fourth wirings are respectively made to each other via contact sections of openings formed in the inorganic insulating film.

4. The display device according to claim 1, further comprising a selection circuit selecting the video signal lines for a video signal to be fed, the selection circuit being arranged in the frame region and in a region between the driving circuit and the display region in a plan view, wherein the selection circuit is arranged between each of the video signal lines and the fourth wiring.

5. The display device according to claim 1, wherein each material for the first wiring and the third wiring formed on the first wiring layer, and each material for the second wiring and the fourth wiring formed on the second wiring layer differ from each other, and a specific resistance of each material for the second wiring and the fourth wiring is lower than a specific resistance of each material for the first wiring and the third wiring.

6. The display device according to claim 5, wherein each thickness of the second wiring and the fourth wiring is larger than each thickness of the first wiring and the third wiring.

7. The display device according to claim 1, further comprising a second substrate arranged opposite the first substrate, wherein an end surface of the organic insulating film is covered with an insulating film or a transparent conductive film in a region not overlapping the second substrate.

8. The display device according to claim 1, further comprising:

a second substrate arranged opposite the first substrate;

a seal provided between the first substrate and the second substrate and making the first substrate and the second substrate adhere to each other; and a liquid crystal layer sealed between the first substrate and the second substrate.

9. The display device according to claim 8, wherein the seal is arranged in the non-formation region.

* * * * *